(12) United States Patent
Cho et al.

(10) Patent No.: US 8,928,732 B2
(45) Date of Patent: Jan. 6, 2015

(54) IMAGE PROCESSING UNIT, STEREOSCOPIC IMAGE DISPLAY USING THE SAME, AND IMAGE PROCESSING METHOD

(75) Inventors: Byoungchul Cho, Seoul (KR); Heejung Hong, Seoul (KR); Daeho Cho, Seoul (KR); Changkyun Park, Inchon (KR)

(73) Assignee: LG Display Co., Ltd., Seoul (KR)

( * ) Notice: Subject to any disclaimer, the term of this patent is extended or adjusted under 35 U.S.C. 154(b) by 411 days.

(21) Appl. No.: 13/313,962

(22) Filed: Dec. 7, 2011

(65) Prior Publication Data

US 2012/0147001 A1    Jun. 14, 2012

(30) Foreign Application Priority Data

Dec. 8, 2010   (KR) .................. 10-2010-0124874

(51) Int. Cl.
| | | |
|---|---|---|
| *H04N 13/00* | (2006.01) | |
| *G02B 27/26* | (2006.01) | |
| *H04N 13/04* | (2006.01) | |
| *G09G 3/00* | (2006.01) | |
| *G09G 3/36* | (2006.01) | |

(52) U.S. Cl.
CPC ............ *G02B 27/26* (2013.01); *H04N 13/0434* (2013.01); *H04N 13/0436* (2013.01); *H04N 13/0452* (2013.01); *G09G 3/003* (2013.01); *H04N 2213/007* (2013.01); *G09G 3/3648* (2013.01)
USPC ............................................. 348/43; 345/419

(58) Field of Classification Search
USPC .............................. 382/154; 348/42; 345/419
See application file for complete search history.

(56) References Cited

U.S. PATENT DOCUMENTS

| | | | |
|---|---|---|---|
| 2006/0012593 A1* | 1/2006 | Iriguchi et al. ................ | 345/204 |
| 2007/0008314 A1 | 1/2007 | Song et al. | |
| 2009/0160931 A1 | 6/2009 | Pockett et al. | |
| 2012/0014590 A1* | 1/2012 | Martinez-Bauza et al. .. | 382/154 |

FOREIGN PATENT DOCUMENTS

| | | |
|---|---|---|
| CN | 1892808 A | 1/2007 |
| CN | 101884222 A | 11/2010 |

\* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP (57) ABSTRACT

An image processing unit, a stereoscopic image display using the same, and an image processing method are disclosed. The image processing unit includes a data modulation unit, that receives 3D image data including left eye image data and right eye image data, compares a pixel data of the left eye image and a pixel data of the right eye image corresponding to the same coordinate of the previously set mask with each other, calculates the number of cases where a difference between the same pixel data of the left eye image data and the right eye image data is equal to or greater than a predetermined threshold value, and modulates the pixel data of the left eye image and the pixel data of the right eye image inside the mask using a first coefficient group of the mask when the number of cases is greater than a predetermined value.

18 Claims, 10 Drawing Sheets

FIG. 1

(RELATED ART)

| L1 | L2 | L3 | L4 |
|----|----|----|----|
| L5 | L6 | L7 | L8 |
| L9 | L10 | L11 | L12 |

FIG. 7B

| R1 | R2 | R3 | R4 |
|----|----|----|----|
| R5 | R6 | R7 | R8 |
| R9 | R10 | R11 | R12 |

FIG. 8A

| 1/4 | 1/4 | 1/4 | 1/4 |
|-----|-----|-----|-----|
| 1/2 | 1/2 | 1/2 | 1/2 |
| 1/4 | 1/4 | 1/4 | 1/4 |

FIG. 8B

| 0 | 0 | 0 | 0 |
|---|---|---|---|
| 1 | 1 | 1 | 1 |
| 0 | 0 | 0 | 0 |

IMAGE PROCESSING UNIT, STEREOSCOPIC IMAGE DISPLAY USING THE SAME, AND IMAGE PROCESSING METHOD

This application claims the benefit of Korea Patent Application No. 10-2010-0124874 filed on Dec. 8, 2010, the entire contents of which is incorporated herein by reference for all purposes as if fully set forth herein.

BACKGROUND OF THE INVENTION

1. Field of the Invention

Embodiments of the invention relate to an image processing unit, a stereoscopic image display using the same, and an image processing method.

2. Discussion of the Related Art

A stereoscopic image display implements a three-dimensional (3D) image using a stereoscopic technique or an autostereoscopic technique. The stereoscopic technique, which uses a parallax image between left and right eyes of a user with a high stereoscopic effect, includes a glasses type method and a non-glasses type method, both of which have been put on the market. In the glasses type method, a stereoscopic image is implemented on a direct-view display or a projector using polarization glasses by varying a polarization direction of the parallax image between the left and right eyes. Alternatively, the stereoscopic image is implemented on the direct-view display or the projector using liquid crystal shutter glasses by displaying the parallax image between the left and right eyes in a time-division manner. In the non-glasses type method, an optical axis of the parallax image between the left and right eyes is generally separated using an optical plate such as a parallax barrier and a lenticular lens, and thus the stereoscopic image is implemented.

Figure 1:
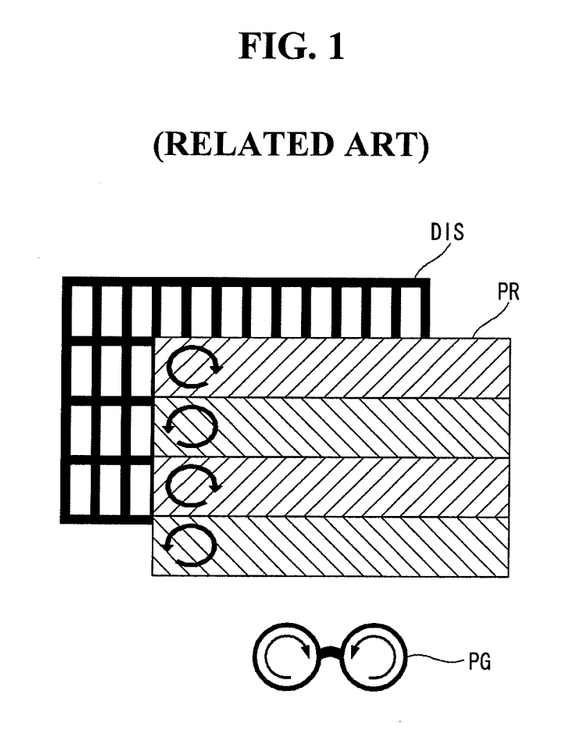
FIG. 1 illustrates a related art patterned retarder type stereoscopic image display.

FIG. 1 illustrates a related art patterned retarder type stereoscopic image display. As shown in FIG. 1, the patterned retarder type stereoscopic image display implements a stereoscopic image using polarization characteristic of a patterned retarder PR disposed on a display panel DIS and polarization characteristic of polarization glasses PG a user wears. The patterned retarder type stereoscopic image display displays a left eye image on odd-numbered lines of the display panel DIS and displays a right eye image on even-numbered lines of the display panel DIS. The left eye image passes through the patterned retarder PR and thus is converted into left-circularly polarized light. The right eye image passes through the patterned retarder PR and thus is converted into right-circularly polarized light. A left eye polarization filter of the polarization glasses PG passes through only the left-circularly polarized light, and a right eye polarization filter of the polarization glasses PG passes through only the right-circularly polarized light. Thus, the user views only the left eye image through his or her left eye and views only the right eye image through his/her right eye.

The patterned retarder type stereoscopic image display displays the left eye image on the odd-numbered lines of the display panel DIS and displays the right eye image on the even-numbered lines of the display panel DIS. In this instance, the left eye image does not include an image corresponding to even-numbered lines of an original image, and the right eye image does not include an image corresponding to odd-numbered lines of the original image. Therefore, a boundary portion of the 3D image is not smooth and may look like steps. The step phenomenon is known as jagging, jagness, or zigzag artifact. In the following description, the step phenomenon is referred to as jagging.

SUMMARY OF THE INVENTION

The present invention relates to image processing unit, a stereoscopic image display using the same, and an image processing method. One object of the present invention is to image processing unit, a stereoscopic image display using the same, and an image processing method which can prevent the jagging when implementing the stereoscopic image in the patterned retarder manner.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect, there is an image processing unit comprising a data modulation unit a data modulation unit configured to receive 3D image data including left eye image data and right eye image data, compare a pixel data of the left eye image and a pixel data of the right eye image corresponding to the same coordinate of the previously set mask with each other, calculate the number of cases where a difference between the same pixel data of the left eye image data and the right eye image data is equal to or greater than a predetermined threshold value, and modulate the pixel data of the left eye image and the pixel data of the right eye image inside the mask using a first coefficient group of the mask when the number of cases is greater than a predetermined value, and a 3D formatter configured to rearrange the 3D image data including the left eye image data and the right eye image data, that are modulated by the data modulation unit, in conformity with a 3D format and output the rearranged 3D image data.

In another aspect, there is a stereoscopic image display comprising a display panel including data lines and gate lines crossing the data lines, an image processing unit configured to estimate a jagging probable region of 3D image data and prevent jagging of the estimated jagging probable region, a data driving circuit configured to covert the 3D image data received from the image processing unit into a data voltage and output the data voltage to the data lines, and a scan driving circuit configured to sequentially output a scan pulse synchronized with the data voltage to the gate lines, wherein the image processing unit includes a data modulation unit configured to receive the 3D image data including left eye image data and right eye image data, compare a pixel data of the left eye image and a pixel data of the right eye image corresponding to the same coordinate of the previously set mask with each other, calculate the number of cases where a difference between the same pixel data of the left eye image data and the right eye image data is equal to or greater than a predetermined threshold value, and modulate the pixel data of the left eye image and the pixel data of the right eye image inside the mask using a first coefficient group of the mask when the number of cases is greater than a predetermined value, and a 3D formatter configured to rearrange the 3D image data including the left eye image data and the right eye image data, that are modulated by the data modulation unit, in conformity with a 3D format and output the rearranged 3D image data.

In yet another aspect, there is an image processing method comprising the steps of (a) receiving 3D image data including left eye image data and right eye image data, comparing a pixel data of the left eye image and a pixel data of the right eye image corresponding to the same coordinate of the previously set mask with each other, calculating the number of cases where a difference between the same pixel data of the left eye image data and the right eye image data is equal to or greater than a predetermined threshold value, and modulating the pixel data of the left eye image and the pixel data of the right eye image inside the mask using a first coefficient group of the mask when the number of cases is greater than a predetermined value, and (b) rearranging the 3D image data including the modulated left eye image data and the modulated right eye image data in conformity with a 3D format and outputting the rearranged 3D image data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted. Names of elements used in the following description may be selected in consideration of facility of specification preparation. Thus, the names of the elements may be different from names of elements used in a real product.

Figure 2:
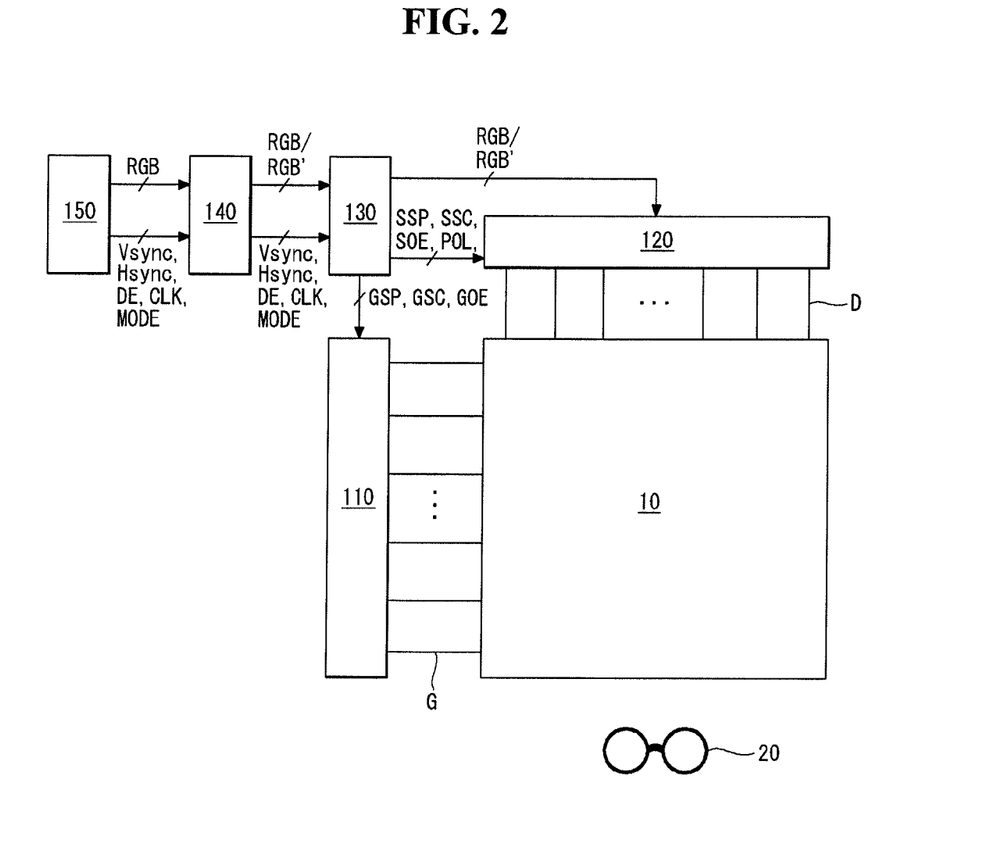
FIG. 2 is a block diagram schematically illustrating a stereoscopic image display according to an example embodiment of the invention.
Figure 3:
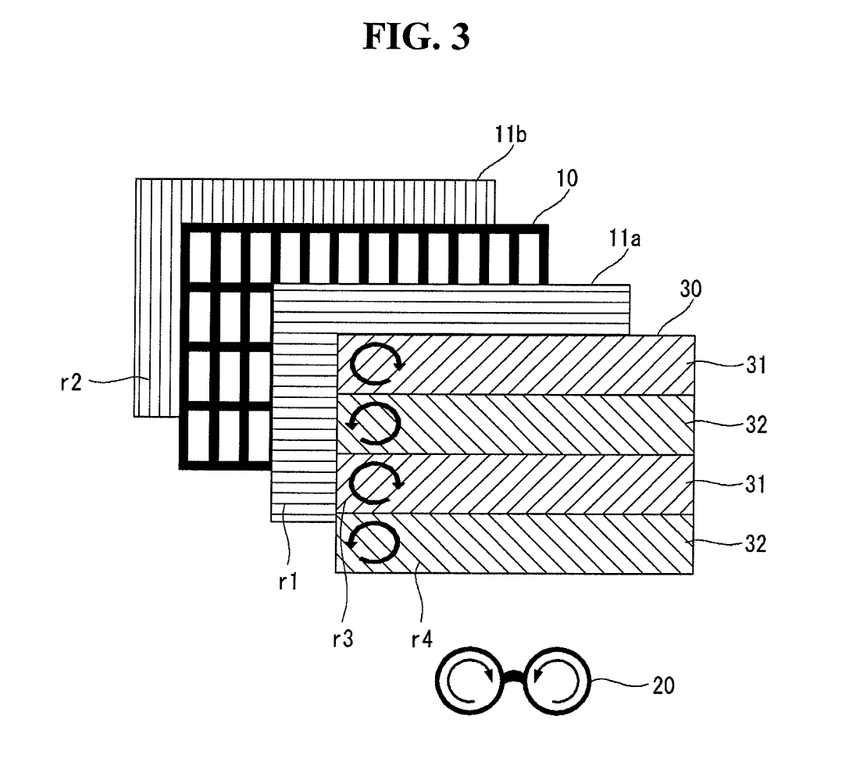
FIG. 3 is an exploded perspective view illustrating a display panel, a patterned retarder, and polarization glasses.

FIG. 2 is a block diagram schematically illustrating a stereoscopic image display according to an example embodiment of the invention. FIG. 3 is an exploded perspective view illustrating a display panel, a patterned retarder, and polarization glasses. The stereoscopic image display according to the example embodiment of the invention may be implemented as a flat panel display such as a liquid crystal display (LCD), a field emission display (FED), a plasma display panel (PDP), and an organic light emitting diode (OLED) display. In the following description, the example embodiment of the invention describes the liquid crystal display as an example of the stereoscopic image display. Other kinds of flat panel displays may be used.

As shown in FIGS. 2 and 3, the stereoscopic image display according to the example embodiment of the invention includes a display panel 10, polarization glasses 20, a gate driver 110, a data driver 120, a timing controller 130, an image processing unit 140, a host system 150, and the like. The display panel 10 displays an image under the control of the timing controller 130. The display panel 10 includes a thin film transistor (TFT) substrate, a color filter substrate, and a liquid crystal layer between the TFT substrate and the color filter substrate.

Data lines D and gate lines (or scan lines) G are formed on the TFT substrate to cross each other, and a plurality of liquid crystal cells are arranged in a plurality of cell regions defined by the data lines D and the gate lines G in a matrix form. A TFT formed at each of crossings of the data lines D and the gate lines G transfers a data voltage supplied via the data line D to a pixel electrode of the liquid crystal cell in response to a gate pulse received through the gate line G. For this, a gate electrode of the TFT is connected to the gate line G, a source electrode of the TFT is connected to the data line D, and a drain electrode of the TFT is connected to the pixel electrode of the liquid crystal cell and a storage capacitor. The storage capacitor holds the data voltage transferred to the pixel electrode for a predetermined time until a next data voltage enters. A common voltage is supplied to a common electrode opposite the pixel electrode.

The color filter substrate includes black matrixes and color filters. The common electrode is formed on the color filter substrate in a vertical electric field driving manner such as a twisted nematic (TN) mode and a vertical alignment (VA) mode. The common electrode is formed on the TFT substrate along with the pixel electrode in a horizontal electric field driving manner such as an in-plane switching (IPS) mode and a fringe field switching (FFS) mode.

As shown in FIG. 3, an upper polarizing plate 11a is attached to the color filter substrate of the display panel 10, and a lower polarizing plate 11b is attached to the TFT substrate of the display panel 10. A light transmission axis r1 of the upper polarizing plate 11a is perpendicular to a light transmission axis r2 of the lower polarizing plate 11b. Alignment layers for setting pre-tilt angles of liquid crystals are respectively formed on the TFT substrate and the color filter substrate of the display panel 10. A spacer is formed between the TFT substrate and the color filter substrate of the display panel 10 so as to provide a cell gap of the liquid crystal layer. The display panel 10 may be implemented in any liquid crystal mode as well as the TN, VA, IPS, and FFS modes.

The display panel 10 displays a two-dimensional (2D) image on odd-numbered lines and even-numbered lines thereof in a 2D mode. The display panel 10 displays a left or right eye image on the odd-numbered lines and displays a right or left eye image on the even-numbered lines in a three-dimensional (3D) mode. Light of the image displayed on the display panel 10 is incident on a patterned retarder 30 disposed on the display panel 10 through an upper polarizing film.

First retarders 31 are formed on odd-numbered lines of the patterned retarder 30, and second retarders 32 are formed on even-numbered lines of the patterned retarder 30. The first retarders 31 retard a phase of light from the display panel 10 by +λ/4, where λ is a wavelength of light. The second retarders 32 retard a phase of the light from the display panel 10 by −λ/4. An optical axis r3 of the first retarder 31 is perpendicular to an optical axis r4 of the second retarder 32. The first retarders 31 may be configured so as to pass through only first circularly polarized light (for example, left-circularly polarized light), and the second retarders 32 may be configured so as to pass through only second circularly polarized light (for example, right-circularly polarized light).

The patterned retarder 30 may include a black stripe for widening a vertical viewing angle. A left eye polarization filter of the polarization glasses 20 has the same optical axis as the first retarder 31 of the patterned retarder 30, and a right eye polarization filter of the polarization glasses 20 has the same optical axis as the second retarder 32 of the patterned retarder 30. For example, a left circular polarization filter may be selected as the left eye polarization filter of the polarization glasses 20, and a right circular polarization filter may be selected as the right eye polarization filter of the polarization glasses 20. A user has to wear the polarization glasses 20 when viewing a 3D image, and has to remove the polarization glasses 20 when viewing a 2D image.

The data driver 120 includes a plurality of source driver integrated circuits (ICs). The source driver ICs convert image data RGB received from the timing controller 130 into positive and negative gamma compensation voltages and generate positive and negative analog data voltages. The source driver ICs then supply the positive and negative analog data voltages to the data lines D of the display panel 10.

The gate driver 110 includes a plurality of gate driver ICs. Each of the gate driver ICs includes a shift register, a level shifter for converting an output signal of the shift register into a signal having a swing width suitable for a TFT drive of the liquid crystal cell, an output buffer, and the like. The gate driver 110 sequentially supplies a gate pulse synchronized with the data voltage to the gate lines G of the display panel 10 under the control of the timing controller 130.

A hold type display element requiring a backlit unit may be selected as the display panel 10. A backlit liquid crystal display panel modulating light from the backlight unit may be generally implemented as the hold type display element. The backlight unit includes a plurality of light sources, that are turned on based on a driving current supplied by a backlight unit driver, a light guide plate (or a diffusion plate), a plurality of optical sheets, and the like. The backlight unit may be implemented as one of an edge type backlight unit and a direct type backlight unit. The light sources of the backlight unit may include one or at least two of a hot cathode fluorescent lamp (HCFL), a cold cathode fluorescent lamp (CCFL), an external electrode fluorescent lamp (EEFL), and a light emitting diode (LED).

The backlight unit driver generates the driving current for turning on the light sources of the backlight unit. The backlight unit driver switches on or off the driving current supplied to the light sources under the control of the timing controller 130. The timing controller 130 outputs backlight control data, that adjusts a backlight luminance and a turn-on timing of the light sources in response to a global or local dimming signal received from the host system 150, to the backlight unit driver in a serial peripheral interface (SPI) data format.

The timing controller 130 outputs a gate control signal for controlling the gate driver 110 to the gate driver 110 and outputs a data control signal for controlling the data driver 120 to the data driver 120 based on image data RGB or modulated image data RGB', timing signals Vsync, Hsync, DE, and CLK, and a mode signal MODE, that are output from the image processing unit 140. The gate control signal includes a gate start pulse GSP, a gate shift clock GSC, a gate output enable GOE, and the like. The gate start pulse GSP controls a timing of a first gate pulse. The gate shift clock GSC shifts the gate start pulse GSP. The gate output enable GOE controls an output timing of the gate driver 110.

The data control signal includes a source start pulse SSP, a source sampling clock SSC, a polarity control signal POL, a source output enable SOE, and the like. The source start pulse SSP controls a data sampling start time point of the data driver 120. The source sampling clock SSC controls a sampling operation of the data driver 120 based on a rising or falling edge thereof. If digital video data to be input to the data driver 120 is transferred based on a mini low voltage differential signaling (LVDS) interface standard, the source start pulse SSP and the source sampling clock SSC may be omitted. The polarity control signal POL inverts a polarity of the data voltage output by the data driver 120 every L horizontal periods, where L is a natural number. The source output enable SOE controls an output timing of the data driver 120.

The host system 150 supplies the image data RGB to the image processing unit 140 through an interface such as an LVDS interface and a transition minimized differential signaling (TMDS) interface. Further, the host system 150 supplies the timing signals Vsync, Hsync, DE, and CLK and the mode signal MODE to the image processing unit 140.

The image processing unit 140 receives the mode signal MODE, which is generated based on the 2D mode and the 3D mode. The mode signal MODE of a low logic level may be generated in the 2D mode, and the mode signal MODE of a high logic level may be generated in the 3D mode. In the 2D mode, the image processing unit 140 outputs the image data RGB received from the host system 150 to the timing controller 130 without the data modulation. In the 3D mode, the image processing unit 140 estimates a jagging probable region of the image data RGB received from the host system 150, modulates pixel data of the estimated jagging probable region, converts the modulated pixel data of the estimated jagging probable region in conformity with a 3D format, and outputs modulated image data RGB' of the 3D format. The timing signals Vsync, Hsync, DE, and CLK received from the host system 150 are converted in conformity with timing of the image data RGB or the modulated image data RGB' output by the image processing unit 140. The image data RGB or the modulated image data RGB' and the timing signals Vsync, Hsync, DE, and CLK are input to the timing controller 130. The image processing unit 140 is described in detail below with reference to FIG. 4.

Figure 4:
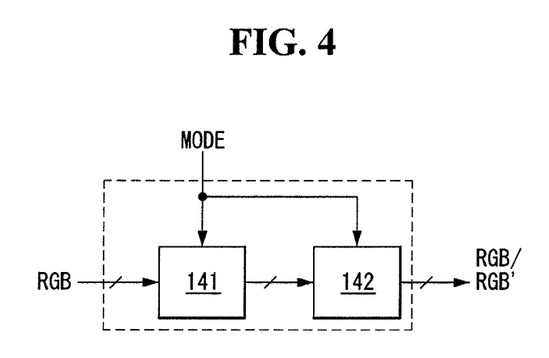
FIG. 4 is a block diagram of an image processing unit shown in FIG. 2.

FIG. 4 is a block diagram of the image processing unit 140 shown in FIG. 2. As shown in FIG. 4, the image processing unit 140 includes a data modulation unit 141 and a 3D formatter 142.

The data modulation unit 141 receives the image data RGB and the mode signal MODE from the host system 150. In the 2D mode, the data modulation unit 141 outputs 2D image data to the 3D formatter 142 without the data modulation. In the 3D mode, the data modulation unit 141 estimates a jagging probable region of 3D image data, modulates pixel data of the estimated jagging probable region, and outputs the modulated pixel data of the estimated jagging probable region.

More specifically, in the 3D mode, when 3D image data including left eye image data and right eye image data is input to the data modulation unit 141, the data modulation unit 141 compares a pixel data of the left eye image and a pixel data of the right eye image data corresponding to the same coordinate of the previously set mask with each other. The data modulation unit 141 calculates the number of cases where a difference between the pixel data of the left eye image and the pixel data of the right eye image data corresponding to the same coordinate is equal to or greater than first threshold value. When the number of cases is equal to or greater than the predetermined value, the data modulation unit 141 modulates the pixel data of the left eye image and the pixel data of the right eye image inside the mask using a first coefficient group of the mask. When the number of cases is less than the predetermined value, the data modulation unit 141 modulates the pixel data of the left eye image and the pixel data of the right eye image inside the mask using a second coefficient group of the mask. Then, the data modulation unit 141 outputs the modulated 3D image data to the 3D formatter 142. A data modulation method of the data modulation unit 141 is described in detail below with reference to FIGS. 4 and 5.

The 3D formatter 142 receives the mode signal MODE from the host system 150 and receives the image data from the data modulation unit 141. In the 2D mode, the 3D formatter 142 outputs the 2D image data without the data modulation. In the 3D mode, the 3D formatter 142 converts the 3D image data in conformity with the 3D format and then outputs the converted 3D image data.

In a patterned retarder type stereoscopic image display, the 3D formatter 142 separates left eye image data and right eye image data from the 3D image data and rearranges the left eye image data and the right eye image data on each line. The 3D formatter 142 arranges the left eye image data on odd-numbered lines and arranges the right eye image data on even-numbered lines. The odd-numbered lines are positioned opposite the first retarders 31 of the patterned retarder 30, and the even-numbered lines are positioned opposite the second retarders 32 of the patterned retarder 30. The 3D formatter 142 outputs the rearranged 3D image data to the timing controller 130.

Figure 5:
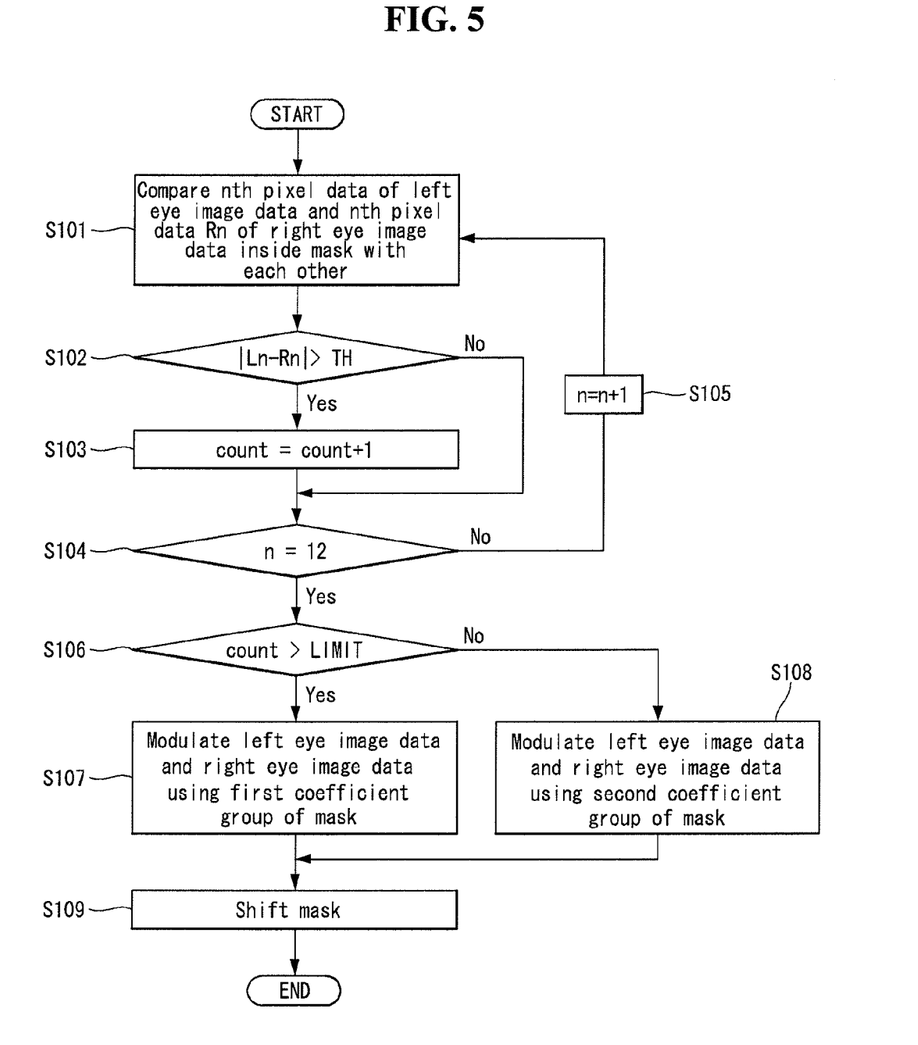
FIG. 5 is a flow chart illustrating a data modulation method of a data modulation unit shown in FIG. 4.

FIG. 5 is a flow chart illustrating a data modulation method of the data modulation unit 141 shown in FIG. 4. The data modulation method according to the example embodiment of the invention estimates a jagging probable region of 3D image data, modulates pixel data of the estimated jagging probable region, and outputs the modulated pixel data of the estimated jagging probable region. The data modulation method according to the example embodiment of the invention is described using a 4×3 mask as an example. Other masks may be used for the data modulation method.

Figure 6A:
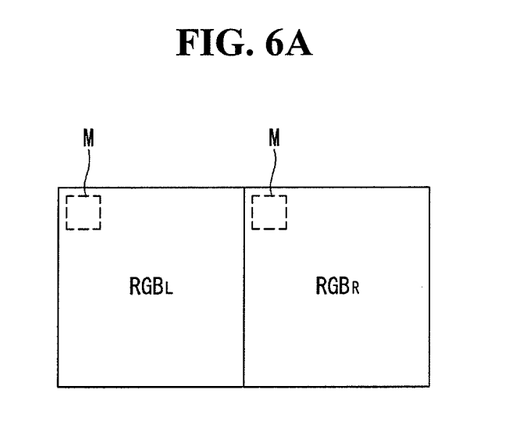
FIGS. 6A to 6C illustrate 3D image data input to a stereoscopic image display according to an example embodiment of the invention.
Figure 6B:
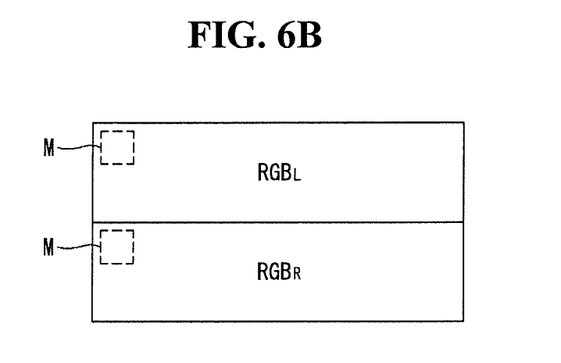
Figure 6C:
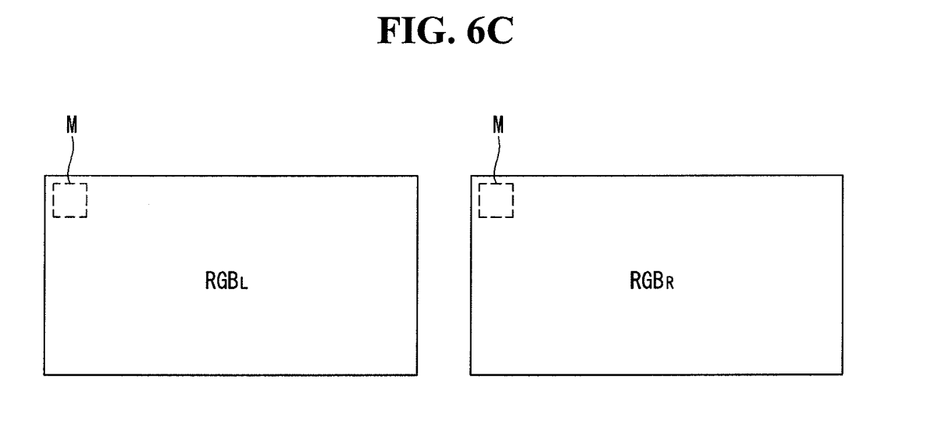

In the 3D mode, the data modulation unit 141 of the image processing unit 140 receives 3D image data including left eye image data $RGB_L$ and right eye image data $RGB_R$ shown in FIGS. 6A to 6C. As shown in FIG. 6A, the left eye image data $RGB_L$ may be input to a left half portion of the 3D image data, and the right eye image data $RGB_R$ may be input to a right half portion of the 3D image data. Alternatively, as shown in FIG. 6B, the left eye image data $RGB_L$ may be input to an upper half portion of the 3D image data, and the right eye image data $RGB_R$ may be input to a lower half portion of the 3D image data. Alternatively, as shown in FIG. 6C, the left eye image data $RGB_L$ may be input in nth frame periods, and the right eye image data $RGB_R$ may be input in (n+1)th frame periods, where n is a natural number. As shown in FIGS. 6A to 6C, the data modulation unit 141 assigns a mask M to the same pixel data of the left eye image data RGBL and the right eye image data RGBR.

Figure 7A:
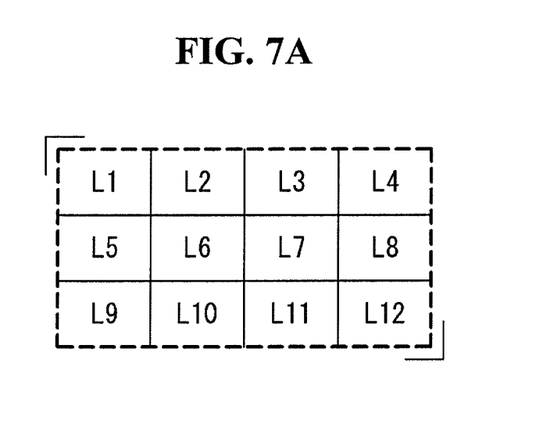
FIGS. 7A and 7B illustrate pixel data of each of left eye image data and right eye image data inside a mask.
Figure 7B:
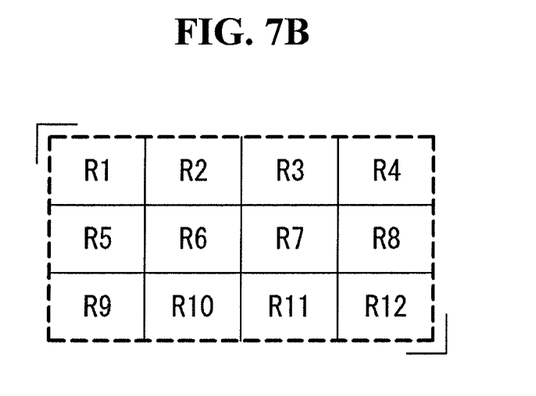

The data modulation unit 141 compares a pixel data of the left eye image and a pixel data of the right eye image data corresponding to the same coordinate of the previously set mask M with each other. In the embodiment of the invention, as shown in FIG. 7A, the pixel data of the left eye image inside 4×3 mask M may be set to first to twelfth pixel data L1 to L12. Further, as shown in FIG. 7B, the pixel data of the right eye image inside the 4×3 mask M may be set to first to twelfth pixel data R1 to R12. The data modulation unit 141 compares nth pixel data Ln of the left eye image data and nth pixel data Rn of the right eye image data inside the previously set mask M with each other in step S101, where n is a natural number within the range of 1≤n≤12.

The data modulation unit 141 decides whether or not a difference between the nth pixel data Ln of the left eye image and the nth pixel data Rn of the right eye image inside the previously set mask M is equal to or greater than a predetermined threshold value TH in step S102. When the difference between the nth pixel data Ln of the left eye image and the nth pixel data Rn of the right eye image is equal to or greater than the predetermined threshold value TH, the data modulation unit 141 increases a count value COUNT in step S103. When the difference between the nth pixel data Ln of the left eye image and the nth pixel data Rn of the right eye image is less than the predetermined threshold value TH, the data modulation unit 141 does not increase the count value COUNT. The predetermined threshold value TH may be previously determined to a value capable of sufficiently deciding the difference between the nth pixel data Ln of the left eye image and the nth pixel data Rn of the right eye image through a previous experiment. The count value COUNT indicates the number of cases where the difference between the nth pixel data Ln of the left eye image and the nth pixel data Rn of the right eye image inside the mask M is equal to or greater than the predetermined threshold value TH.

The data modulation unit 141 decides whether or not to compare all of the pixel data of the left eye image and all of the pixel data of the right eye image inside the mask M with each other. Because the left eye image and the right eye image each have the 12 pixel data inside the 4×3 mask M according to the embodiment of the invention, the data modulation unit 141 decides whether or not 'n' in the nth pixel data Ln of the left eye image and the nth pixel data Rn of the right eye image is 12. When 'n' in the nth pixel data Ln and the nth pixel data Rn is 12, the data modulation unit 141 decides that all of the pixel data of the left eye image and all of the pixel data of the right eye image inside the mask M were compared with each other. When 'n' in the nth pixel data Ln and the nth pixel data Rn is not 12, the data modulation unit 141 increases 'n' by 1 and repeatedly decides whether or not the difference between the nth pixel data Ln of the left eye image and the nth pixel data Rn of the right eye image inside the mask M is equal to or greater than the predetermined threshold value TH until 'n' is 12, in steps S104 and 105.

When the data modulation unit 141 decides that all of the pixel data of the left eye image and all of the pixel data of the right eye image inside the mask M were compared with each other, the data modulation unit 141 decides whether or not the count value COUNT is greater than a predetermined value LIMIT. The predetermined value LIMIT may be previously determined to a value capable of deciding the differences between the pixel data of the left eye image and the pixel data of the right eye image inside the mask M through a previous experiment. When the count value COUNT is greater than the predetermined value LIMIT, the data modulation unit 141 decides a region of the mask M as the jagging probable region because there is the difference between the pixel data of the left eye image data and the pixel data of the right eye image data inside the mask M in step S106.

Figure 8A:
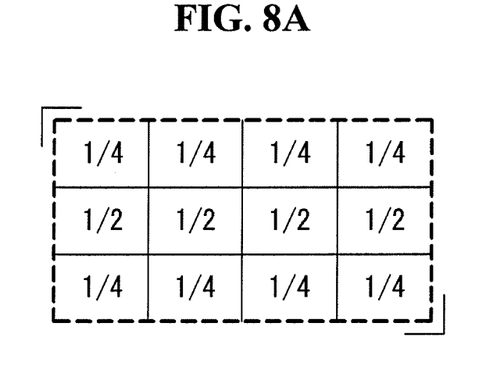
FIGS. 8A and 8B illustrate a first coefficient group and a second coefficient group of a mask according to an example embodiment of the invention.

Because the region of the mask M corresponds to the jagging probable region when the count value COUNT is greater than the predetermined value LIMIT, the data modulation unit 141 modulates the pixel data of the left eye image and the pixel data of the right eye image inside the mask M using a first coefficient group of the mask M. Coefficients belonging to the first coefficient group are greater than 0 and less than 1 and include at least two different values. For example, as shown in FIG. 8A, the first coefficient group of the mask M may be set so that a sum of a coefficient corresponding to pixel data of a (p−1)th line, a coefficient corresponding to pixel data of a pth line, and a coefficient corresponding to pixel data of a (p+1)th line is 1, where p is a natural number equal to or greater than 2. The data modulation unit 141 calculates the pixel data of the left eye image data inside the mask M shown in FIG. 7A and the first coefficient group of the mask M shown in FIG. 8A as indicated by following Equation 1 in step S107.

$$L5' = \frac{1}{4} \times L1 + \frac{1}{2} \times L5 + \frac{1}{4} \times L9$$

$$L6' = \frac{1}{4} \times L2 + \frac{1}{2} \times L6 + \frac{1}{4} \times L10$$

$$L7' = \frac{1}{4} \times L3 + \frac{1}{2} \times L7 + \frac{1}{4} \times L11$$

$$L8' = \frac{1}{4} \times L4 + \frac{1}{2} \times L8 + \frac{1}{4} \times L12$$

[Equation 1]

As indicated by Equation 1, the data modulation unit 141 calculates the pixel data of the left eye image inside the mask M and the first coefficient group of the mask M and modulates only the fifth to eighth pixel data L5, L6, L7, and L8. More specifically, the data modulation unit 141 calculates the first pixel data L1 of the (p−1)th line, the fifth pixel data L5 of the pth line, the ninth pixel data L9 of the (p+1)th line, and the coefficients of the first coefficient group of the mask M corresponding to the pixel data L1, L5, and L9, thereby calculating modulated fifth pixel data L5'. The data modulation unit 141 obtains modulated sixth to eight pixel data L6', L7', and L8' using the same calculation method as the modulated fifth pixel data L5'. Further, the data modulation unit 141 calculates the pixel data of the right eye image inside the mask M shown in FIG. 7B and the first coefficient group of the mask M shown in FIG. 8A as indicated by following Equation 1 in step S107.

Figure 8B:
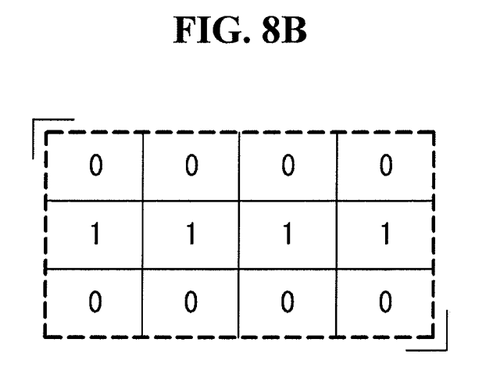

When the count value COUNT is equal to or less than the predetermined vale LIMIT, the data modulation unit 141 modulates the pixel data of the left eye image and the pixel data of the right eye image inside the mask M using the second coefficient group of the mask M in step S108. For example, as shown in FIG. 8B, the second coefficient group of the mask M may be set so that a sum of a coefficient corresponding to pixel data of the (p−1)th line, a coefficient corresponding to pixel data of the pth line, and a coefficient corresponding to pixel data of the (p+1)th line is 1. Because the region of the mask M does not correspond to the jagging probable region when the count value COUNT is equal to or less than the predetermined value LIMIT, coefficients belonging to the second coefficient group are set so that the fifth to eight pixel data L5 to L8 of the left eye image data are output without the data modulation. Namely, the coefficients of the second coefficient group corresponding to the fifth to eight pixel data L5 to L8 of the left eye image data are set to 1, and the coefficients of the second coefficient group corresponding to the remaining pixel data of the left eye image are set to 0. The data modulation unit 141 calculates the pixel data of the left eye image inside the mask M shown in FIG. 7A and the second coefficient group of the mask M shown in FIG. 8B as indicated by following Equation 2.

$$L5' = 0 \times L1 + 1 \times L5 + 0 \times L9$$

$$L6' = 0 \times L2 + 1 \times L6 + 0 \times L10$$

$$L7' = 0 \times L3 + 1 \times L7 + 0 \times L11$$

$$L8' = 0 \times L4 + 1 \times L8 + 0 \times L12$$

[Equation 2]

As indicated by Equation 2, the data modulation unit 141 calculates the pixel data of the left eye image inside the mask M and the second coefficient group of the mask M and outputs the fifth to eighth pixel data L5, L6, L7, and L8 without the data modulation. More specifically, the data modulation unit 141 calculates the first pixel data L1 of the (p−1)th line, the fifth pixel data L5 of the pth line, the ninth pixel data L9 of the (p+1)th line, and the coefficients of the second coefficient group of the mask M corresponding to the pixel data L1, L5, and L9, thereby outputting the fifth pixel data L5 without the data modulation as modulated fifth pixel data L5'. The data modulation unit 141 obtains modulated sixth to eight pixel data L6', L7', and L8' using the same calculation method as the modulated fifth pixel data L5'. Further, the data modulation unit 141 calculates the pixel data of the right eye image inside the mask M shown in FIG. 7B and the second coefficient group of the mask M shown in FIG. 8B as indicated by following Equation 2 in step S108.

Figure 9A:
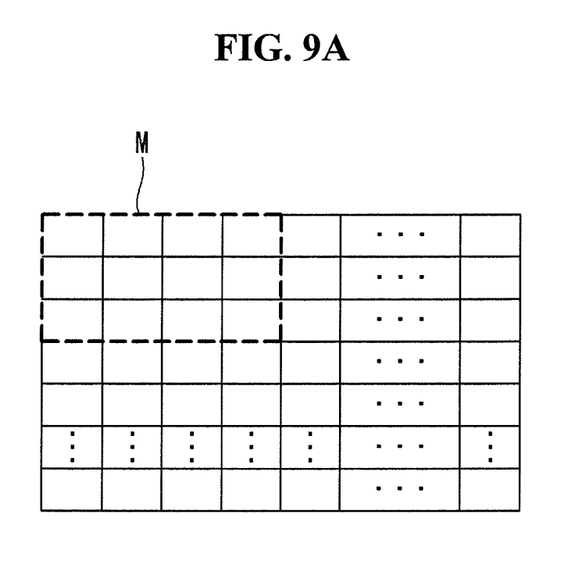
FIGS. 9A to 9C illustrate a computation order of a mask according to an example embodiment of the invention.
Figure 9B:
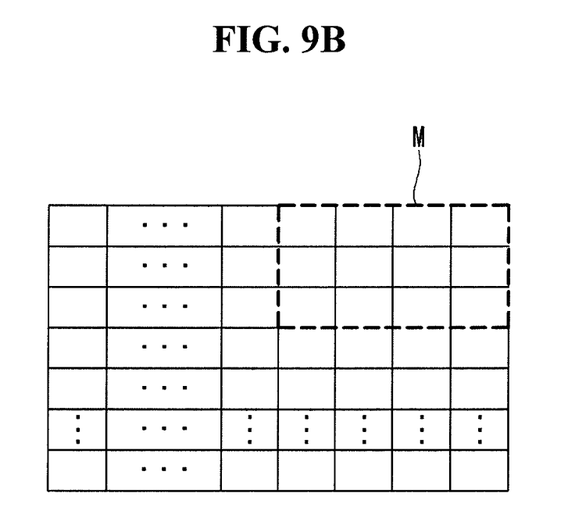
Figure 9C:
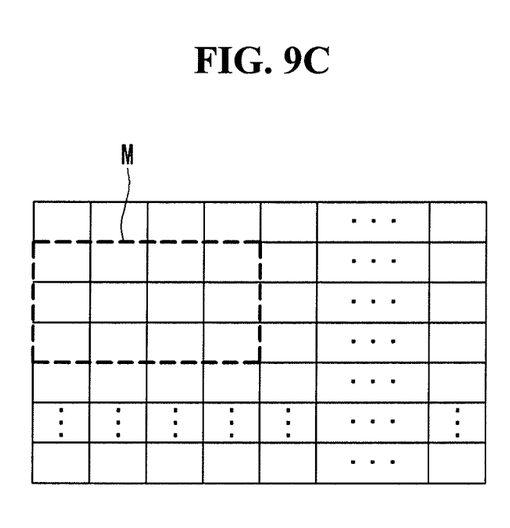

As shown in FIG. 9A, when the data modulation unit 141 modulates the pixel data of the left eye image data and the pixel data of the right eye image data inside the mask M, the data modulation unit 141 shifts the mask M by a transverse length of the mask M in the right direction. When the data modulation unit 141 can no longer shift the mask M in the right direction as shown in FIG. 9B, the data modulation unit 141 shifts the mask M to the left end of one lower line as shown in FIG. 9C in step S109.

As described above, the stereoscopic image display according to the example embodiment of the invention estimates the jagging probable region of the 3D image data and modulates the pixel data of the estimated jagging probable region. As a result, the stereoscopic image display according to the example embodiment of the invention can prevent the jagging when implementing the stereoscopic image in the patterned retarder manner.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image processing unit comprising:
a data modulation unit configured to receive 3D image data including left eye image data and right eye image data, compare a pixel data of the left eye image and a pixel data of the right eye image corresponding to the same coordinate of the previously set mask with each other, calculate the number of cases where a difference between the same pixel data of the left eye image data and the right eye image data is equal to or greater than a predetermined threshold value, and modulate the pixel data of the left eye image and the pixel data of the right eye image inside the mask using a first coefficient group of the mask when the number of cases is greater than a predetermined value;
a 3D formatter configured to rearrange the 3D image data including the left eye image data and the right eye image data, that are modulated by the data modulation unit, in conformity with a 3D format and output the rearranged 3D image data,
a first retarder configured to pass through a first polarized light of the left eye image; and
a second retarder configured to pass through a second polarized light of the right eye image.

2. The image processing unit of claim 1, wherein coefficients belonging to the first coefficient group of the mask are greater than 0 and less than 1 and include at least two different values.

3. The image processing unit of claim 2, wherein when the number of cases is less than the predetermined value, the data modulation unit modulates the pixel data of the left eye image and the pixel data of the right eye image inside the mask using a second coefficient group of the mask.

4. The image processing unit of claim 3, wherein each of the first coefficient group and the second coefficient group is set so that a sum of a coefficient corresponding to pixel data of a (p-1)th line, a coefficient corresponding to pixel data of a pth line, and a coefficient corresponding to pixel data of a (p+1)th line is 1, where p is a natural number equal to or greater than 2.

5. The image processing unit of claim 4, wherein the second coefficient group is set so that the coefficient corresponding to the pixel data of the pth line is 1 and the coefficient corresponding to the pixel data of the (p-1)th line and the coefficient corresponding to the pixel data of the (p+1)th line are zero.

6. The image processing unit of claim 3, wherein the data modulation unit modulates the pixel data of the left eye image and the pixel data of the right eye image inside the mask using the first coefficient group or the second coefficient group of the mask, shifts the mask, and modulates the pixel data of the left eye image and the pixel data of the right eye image inside the shifted mask using the first coefficient group or the second coefficient group of the mask.

7. A stereoscopic image display comprising:
a display panel including data lines and gate lines crossing the data lines;
an image processing unit configured to estimate a jagging probable region of 3D image data and prevent jagging of the estimated jagging probable region;
a data driving circuit configured to covert the 3D image data received from the image processing unit into a data voltage and output the data voltage to the data lines; and
a scan driving circuit configured to sequentially output a scan pulse synchronized with the data voltage to the gate lines,
wherein the image processing unit includes:
a data modulation unit configured to receive the 3D image data including left eye image data and right eye image data, compare a pixel data of the left eye image and a pixel data of the right eye image corresponding to the same coordinate of the previously set mask with each other, calculate the number of cases where a difference between the same pixel data of the left eye image data and the right eye image data is equal to or greater than a predetermined threshold value, and modulate the pixel data of the left eye image and the pixel data of the right eye image inside the mask using a first coefficient group of the mask when the number of cases is greater than a predetermined value; and
a 3D formatter configured to rearrange the 3D image data including the left eye image data and the right eye image data, that are modulated by the data modulation unit, in conformity with a 3D format and output the rearranged 3D image data.

8. The stereoscopic image display of claim 7, wherein coefficients belonging to the first coefficient group of the mask are greater than 0 and less than 1 and include at least two different values.

9. The stereoscopic image display of claim 8, wherein when the number of cases is less than the predetermined value, the data modulation unit modulates the pixel data of the left eye image and the pixel data of the right eye image inside the mask using a second coefficient group of the mask.

10. The stereoscopic image display of claim 9, wherein each of the first coefficient group and the second coefficient group is set so that a sum of a coefficient corresponding to pixel data of a (p-1)th line, a coefficient corresponding to pixel data of a pth line, and a coefficient corresponding to pixel data of a (p+1)th line is 1, where p is a natural number equal to or greater than 2.

11. The stereoscopic image display of claim 10, wherein the second coefficient group is set so that the coefficient corresponding to the pixel data of the pth line is 1 and the coefficient corresponding to the pixel data of the (p-1)th line and the coefficient corresponding to the pixel data of the (p+1)th line are zero.

12. The stereoscopic image display of claim 9, wherein the data modulation unit modulates the pixel data of the left eye image and the pixel data of the right eye image inside the mask using the first coefficient group or the second coefficient group of the mask, shifts the mask, and modulates the pixel data of the left eye image and the pixel data of the right eye image inside the shifted mask using the first coefficient group or the second coefficient group of the mask.

13. An image processing method comprising the steps of:
(a) receiving 3D image data including left eye image data and right eye image data, comparing a pixel data of the left eye image and a pixel data of the right eye image corresponding to the same coordinate of the previously set mask with each other, calculating the number of cases where a difference between the same pixel data of the left eye image data and the right eye image data is equal to or greater than a predetermined threshold value, and modulating the pixel data of the left eye image and the pixel data of the right eye image inside the mask using a first coefficient group of the mask when the number of cases is greater than a predetermined value;
(b) rearranging the 3D image data including the modulated left eye image data and the modulated right eye image data in conformity with a 3D format and outputting the rearranged 3D image data, and
(c) passing through a first polarized light of the left eye image through a first retarder and a second polarized light of the right eye image through a second retarder.

14. The image processing method of claim 13, wherein coefficients belonging to the first coefficient group of the mask are greater than 0 and less than 1 and include at least two different values.

15. The image processing method of claim 14, wherein the step (a) includes modulating the pixel data of the left eye image and the pixel data of the right eye image inside the mask using a second coefficient group of the mask when the number of cases is equal to or less than the predetermined value.

16. The image processing method of claim 15, wherein each of the first coefficient group and the second coefficient group is set so that a sum of a coefficient corresponding to pixel data of a (p-1)th line, a coefficient corresponding to pixel data of a pth line, and a coefficient corresponding to pixel data of a (p+1)th line is 1, where p is a natural number equal to or greater than 2.

17. The image processing method of claim 16, wherein the second coefficient group is set so that the coefficient corresponding to the pixel data of the pth line is 1 and the coefficient corresponding to the pixel data of the (p-1)th line and the coefficient corresponding to the pixel data of the (p+1)th line are zero.

18. The image processing method of claim 15, wherein the step (a) includes modulating the pixel data of the left eye image and the pixel data of the right eye image inside the mask using the first coefficient group or the second coefficient group of the mask, shifting the mask, and modulating the pixel data of the left eye image and the pixel data of the right eye image inside the shifted mask using the first coefficient group or the second coefficient group of the mask.

\* \* \* \* \*